United States Patent
Jun et al.

(10) Patent No.: US 12,052,536 B2
(45) Date of Patent: Jul. 30, 2024

(54) PORTABLE TERMINAL HAVING SPEAKER AND ACOUSTIC OUTPUT PATH FOR SPEAKER

(71) Applicant: Samsung Electronics Co., Ltd., Suwon-si (KR)

(72) Inventors: Sungsoo Jun, Suwon-si (KR); Namjun Kim, Suwon-si (KR); Sejin Kim, Suwon-si (KR); Youngmoon Park, Suwon-si (KR); Youngkyu Kim, Suwon-si (KR); Jongchun Wee, Suwon-si (KR); Hwanseok Choi, Suwon-si (KR); Byounguk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/460,209

(22) Filed: Sep. 1, 2023

(65) Prior Publication Data

US 2023/0421937 A1  Dec. 28, 2023

Related U.S. Application Data

(63) Continuation of application No. 17/159,826, filed on Jan. 27, 2021, now Pat. No. 11,750,958.

(30) Foreign Application Priority Data

Feb. 10, 2020 (KR) .................. 10-2020-0015964

(51) Int. Cl.
*H04R 1/02* (2006.01)
*H04N 23/51* (2023.01)
(Continued)

(52) U.S. Cl.
CPC ............. *H04R 1/028* (2013.01); *H04N 23/51* (2023.01); *H04N 23/54* (2023.01); *H04B 1/3827* (2013.01);
(Continued)

(58) Field of Classification Search
CPC ...... H04R 1/26; H04R 1/2803; H04R 1/2826; H04R 1/2857; H04R 2499/11; H04R 2499/15
See application file for complete search history.

(56) References Cited

U.S. PATENT DOCUMENTS 7,410,029 B2  8/2008  Tanaami
8,090,124 B2  1/2012  Nakagawa
(Continued)

FOREIGN PATENT DOCUMENTS

CN  102572036 A  7/2012
CN  110113453 A  8/2019
(Continued)

OTHER PUBLICATIONS

European Office Action dated Jan. 3, 2024, issued in European Application No. 21 754 186.1-1224.
(Continued)

*Primary Examiner* — Kile O Blair
(74) *Attorney, Agent, or Firm* — Jefferson IP Law, LLP

(57) ABSTRACT

An electronic device is provided. The electronic device includes a housing including a first surface facing in a first direction, a second surface facing in a second direction opposite to the first direction, and a side surface member enclosing the first surface and the second surface, a display visible through at least a portion of the first surface, an opening formed on a portion of the first surface, a speaker positioned within the housing, a sensor positioned within the housing, and a first path configured to guide a sound of the
(Continued)

speaker to the opening, and a second path configured to guide the sound of the speaker to the opening and to avoid overlapping the first path, and at least a portion of the sensor is positioned between the first path and the second path.

10 Claims, 9 Drawing Sheets

(51) Int. Cl.
*H04N 23/54* (2023.01)
*H04B 1/3827* (2015.01)

(52) U.S. Cl.
CPC ...... *H04R 2499/11* (2013.01); *H04R 2499/15* (2013.01)

(56) References Cited

U.S. PATENT DOCUMENTS

| 8,934,228 | B2 | 1/2015 | Franklin et al. |
| 2012/0053711 | A1 | 3/2012 | Shedletsky et al. |
| 2015/0219608 | A1 | 8/2015 | Choi et al. |
| 2019/0052954 | A1 | 2/2019 | Rusconi Clerici Beltrami et al. |
| 2021/0006876 | A1 | 1/2021 | Moon et al. |
| 2022/0046345 | A1 | 2/2022 | Mai |

FOREIGN PATENT DOCUMENTS

| JP | 4266923 B2 | 5/2009 |
| KR | 10-0897794 B1 | 5/2009 |
| KR | 10-1217411 B1 | 1/2013 |
| KR | 10-2015-0092579 A | 8/2015 |
| KR | 10-2016-0089126 A | 7/2016 |
| KR | 10-2019-0086899 A | 7/2019 |
| WO | 2019/213956 A1 | 11/2019 |
| WO | 2020/014838 A1 | 1/2020 |

OTHER PUBLICATIONS

International Search Report dated May 31, 2021, issued in International Patent Application No. PCT/KR2021/001026.
European Search Report dated Oct. 5, 2022, issued in European Patent Application No. 21754186.1.

PORTABLE TERMINAL HAVING SPEAKER AND ACOUSTIC OUTPUT PATH FOR SPEAKER

CROSS-REFERENCE TO RELATED APPLICATION(S)

This application is a continuation application of prior application Ser. No. 17/159,826, filed on Jan. 27, 2021, and was based on and claimed priority under 35 U.S.C. § 119(a) of a Korean patent application number 10-2020-0015964, filed on Feb. 10, 2020, in the Korean Intellectual Property Office, the disclosure of which is incorporated by reference herein in its entirety.

BACKGROUND

1. Field

The disclosure relates to an electronic device including a speaker.

2. Description of Related Art

As portable terminals are widely used, there are many people who consume contents such as games, videos, and the like by using portable terminals. People spend more time using portable terminals than watching television (TV) programs, movies through televisions. Also, many people web surf through portable devices and there is an increasing demand for a large-screen display that may provide much information on a single screen. Accordingly, portable devices having a thin bezel to implement a large-screen display are being released.

The above information is presented as background information only to assist with an understanding of the disclosure. No determination has been made, and no assertion is made, as to whether any of the above might be applicable as prior art with regard to the disclosure.

SUMMARY

With the demand for a large-screen display, consumers' standards on performance of a speaker in a portable terminal are increasing. Users expect to have clear and rich sounds when enjoying music or movie by using portable terminals. Since a space occupied by a speaker in a portable terminal is limited, it is not easy for the speaker provided in the portable terminal to provide excellent quality sound.

Aspects of the disclosure are to address at least the above-mentioned problems and/or disadvantages and to provide at least the advantages described below. Accordingly, an aspect of the disclosure is to provide an electronic device which can output a clear and rich sound. Specifically, various embodiments provide a structure that allows a sound generated in a speaker positioned within a housing of a portable terminal to be smoothly emitted to the outside of the portable terminal.

The technical object to be achieved by the disclosure is not limited to that mentioned above, and other technical objects that are not mentioned above may be clearly understood to those skilled in the art based on the description provided below.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface facing in a first direction, a second surface facing in a second direction opposite to the first direction, and a side surface member enclosing the first surface and the second surface, a display visible through at least a portion of the first surface, an opening formed on a portion of the first surface, a speaker positioned within the housing, a sensor positioned within the housing, and a first path configured to guide a sound of the speaker to the opening, and a second path configured to guide the sound of the speaker to the opening and to avoid overlapping the first path, and at least a portion of the sensor is positioned between the first path and the second path.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
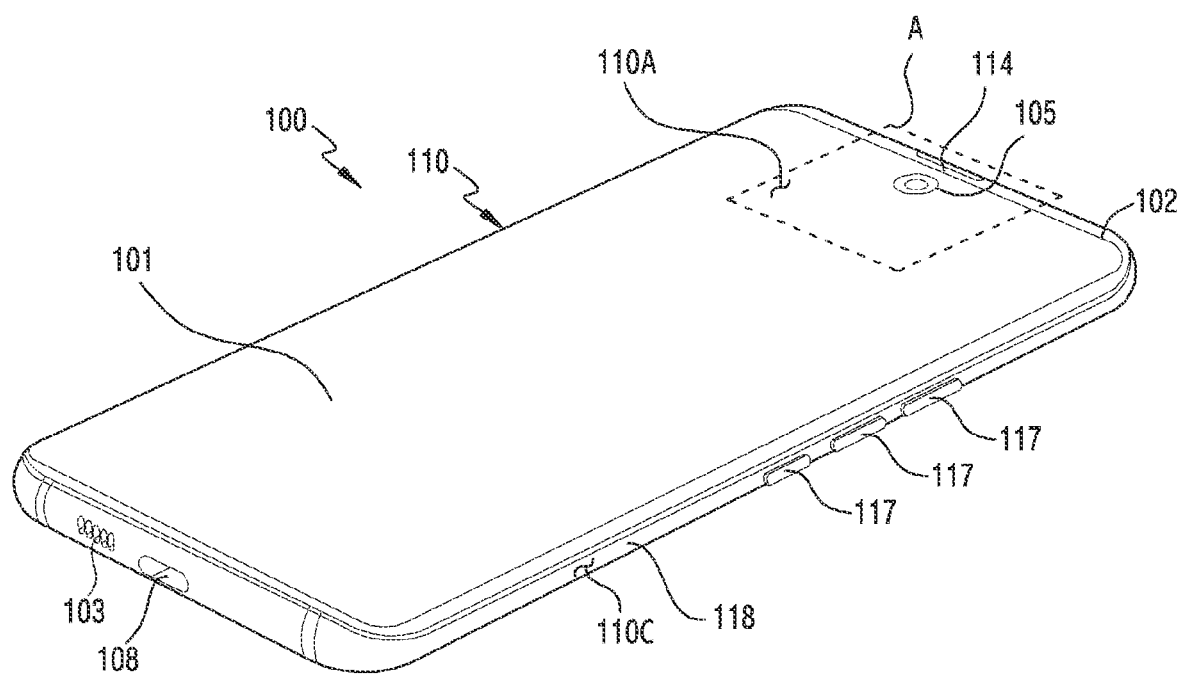
FIG. 1 is a perspective view illustrating an electronic device according to an embodiment of the disclosure.

FIG. 1 is a perspective view illustrating an electronic device 100 according to an embodiment of the disclosure.

Figure 2:
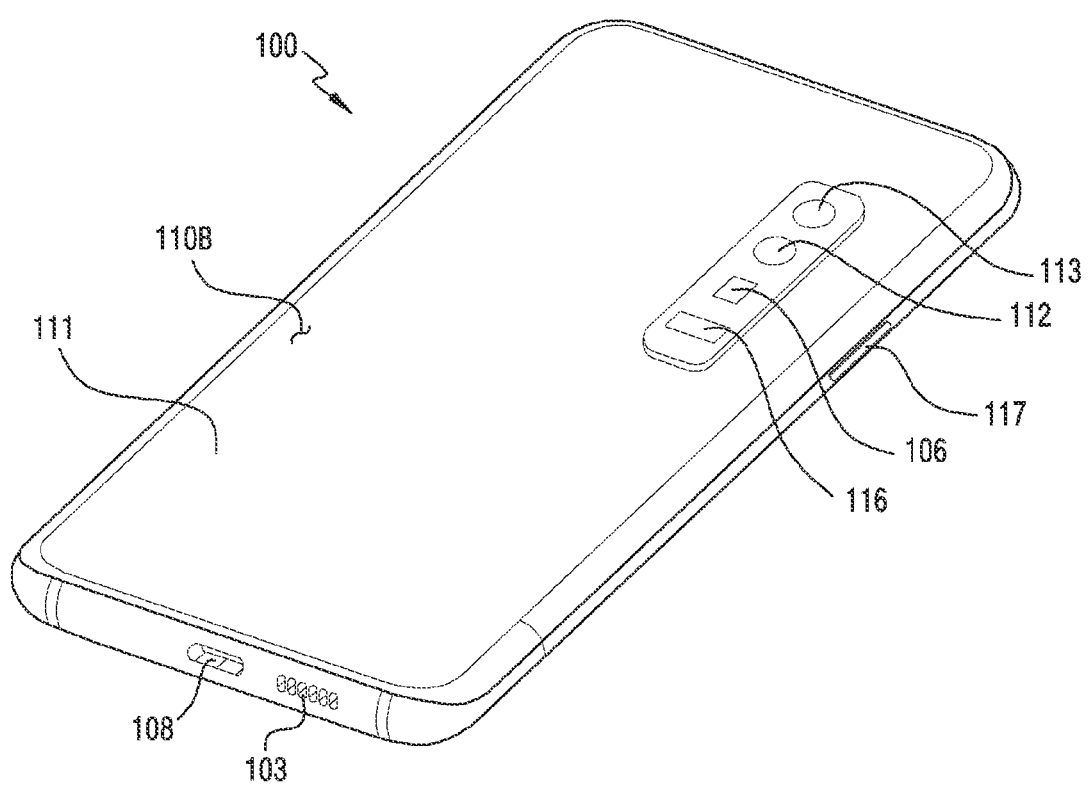
FIG. 2 is a perspective view illustrating an electronic device of FIG. 1 when it is viewed from the back according to an embodiment of the disclosure.

FIG. 2 is a perspective view illustrating an electronic device of FIG. 1 when it is viewed from the back according to an embodiment of the disclosure.

Referring to FIGS. 1 and 2, the electronic device 100 according to an embodiment may include a housing 110 including a first surface (or a front surface) 110A, a second surface (or a rear surface) 110B, and a side surface (or a sidewall) 110C enclosing a space between the first surface 110A and the second surface 110B. In another embodiment (not shown), the housing may refer to a structure that forms a portion of the first surface 110A, the second surface 110B and the side surface 110C of FIG. 1.

According to an embodiment, the first surface 110A may be formed by a front surface plate 102 (for example, a glass plate including various coating layers, or a polymer plate) having at least a portion thereof substantially transparent. According to an embodiment, the front surface plate 102 may include a curved portion that is bent from the first surface 110A toward a rear surface plate 111 on at least a side edge portion and is seamlessly extended.

In an embodiment, the second surface 110B may be formed by the rear surface plate 111 which is substantially opaque. The rear surface plate 111 may be formed by, for example, coated or colored glass, ceramic, a polymer, metal (for example, aluminum, stainless steel (STS), or magnesium), or a combination of at least two of the above-mentioned materials. According to an embodiment, the rear surface plate 111 may include a curved portion that is bent from the second surface 110B toward the front surface plate 102 on at least a side edge portion and is seamlessly extended.

In an embodiment, the side surface 110C may be coupled with the front surface plate 102 and the rear surface plate 111, and may be formed by a side surface bezel structure (or a "side surface member or sidewall") 118 including metal and/or a polymer. In a certain embodiment, the rear surface plate 111 and the side surface bezel structure 118 may be integrally formed with each other, and may include the same material (for example, a metallic material such as aluminum).

In an embodiment, the electronic device 100 may include at least one of a display 101, an audio module 103 and 114, a sensor module, a camera module 105, a key input device 117, and a connector hole 108. In a certain embodiment, the electronic device 100 may omit at least one (for example, the key input device 117) of the components or may additionally include other components. For example, the electronic device 100 may include the sensor module which is not illustrated. For example, a sensor such as a proximity sensor or an illuminance sensor may be integrated into the display 101 within an area provided by the front surface plate 102, or may be disposed on a position adjacent to the display 101. In a certain embodiment, the electronic device 100 may further include a light emitting element, and the light emitting element may be disposed on a position adjacent to the display 101 within an area provided by the front surface plate 102. The light emitting element may provide state information of the electronic device 100 in the form of light. In another embodiment, the light emitting element may provide a light source which operates in association with the operation of the camera module 105. The light emitting element may include, for example, a light emitting diode (LED), an infrared LED (IR LED), and a xenon lamp.

The display 101 may be exposed through a substantial portion of the front surface plate 102, for example. In a certain embodiment, an edge of the display 101 may be formed substantially the same as a shape of a border (for example, a curved surface) of the front surface plate 102 that is adjacent to the display. In another embodiment (not shown), a gap between the border of the display 101 and the border of the front surface plate 102 may be formed substantially the same to extend an exposed area of the display 101. In another embodiment (not shown), a recess or an opening may be formed on a portion of a screen display area of the display 101, and the electronic device 100 may include other electronic components aligned with the recess or the opening, for example, the camera module 105, a proximity sensor (not shown) or an illuminance sensor (not shown).

In another embodiment (not shown), at least one of a camera module 112 and 113, a fingerprint sensor 116, and a flash 106 may be included on a back surface of the screen display area of the display 101. In another embodiment (not shown), the display 101 may be coupled with or disposed adjacent to a touch detection circuitry, a pressure sensor for measuring an intensity (pressure) of a touch, and/or a digitizer for detecting a stylus pen of a magnetic field method.

In an embodiment, the audio module 103 and 114 may include a microphone hole and a speaker hole. The microphone hole may have a microphone disposed therein to acquire an external sound, and in a certain embodiment, the microphone hole may have a plurality of microphones disposed therein to detect a direction of a sound. In a certain embodiment, the speaker hole and the microphone hole may be implemented as one hole 103, or a speaker (for example, a piezo speaker) may be included without a speaker hole. The speaker hole may include an external speaker hole or a receiver hole 114 for communication.

The electronic device 100 may include the sensor module which is not illustrated, thereby generating an electric signal or a data value corresponding to an internal operation state or an external environment state. The sensor module may further include a proximity sensor disposed on the first surface 110A of the housing 110, a fingerprint sensor integrated into or disposed adjacent to the display 101, and/or a biometric sensor (for example, a heart rate monitor (HRM) sensor) disposed on the second surface 110B of the housing 110. The electronic device 100 may further include a sensor module (not shown), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

In an embodiment, the camera module 105, 112, 113 and 106 may include a first camera device disposed on the first surface 110A of the electronic device 100, a second camera device 112 and 113 disposed on the second surface 110B, and/or the flash 106. The camera devices 105, 112 and 113 may include one lens or a plurality of lenses, an image sensor, and/or an image signal processor. The flash 106 may include, for example, a light emitting diode or a xenon lamp. In a certain embodiment, two or more lenses (an infrared camera, a wide angle lens and a telephoto lens) and image sensors may be disposed on one surface of the electronic device 100.

In an embodiment, the key input device 117 may be disposed on the side surface 110C of the housing 110. In another embodiment, the electronic device 100 may not include a portion or an entirety of the above-mentioned key input device 117, and the key input device 117 that is not included may be implemented on the display 101 in other forms such as a soft key. In a certain embodiment, the key input device may include at least a portion of the fingerprint sensor 116 disposed on the second surface 110B of the housing 110.

In an embodiment, the connector hole 108 may accommodate a connector for transmitting and receiving power and/or data to and from an external electronic device, and/or a connector for transmitting and receiving an audio signal to and from an external electronic device. For example, the connector hole 108 may include a USB connector or an earphone jack.

Figure 3:
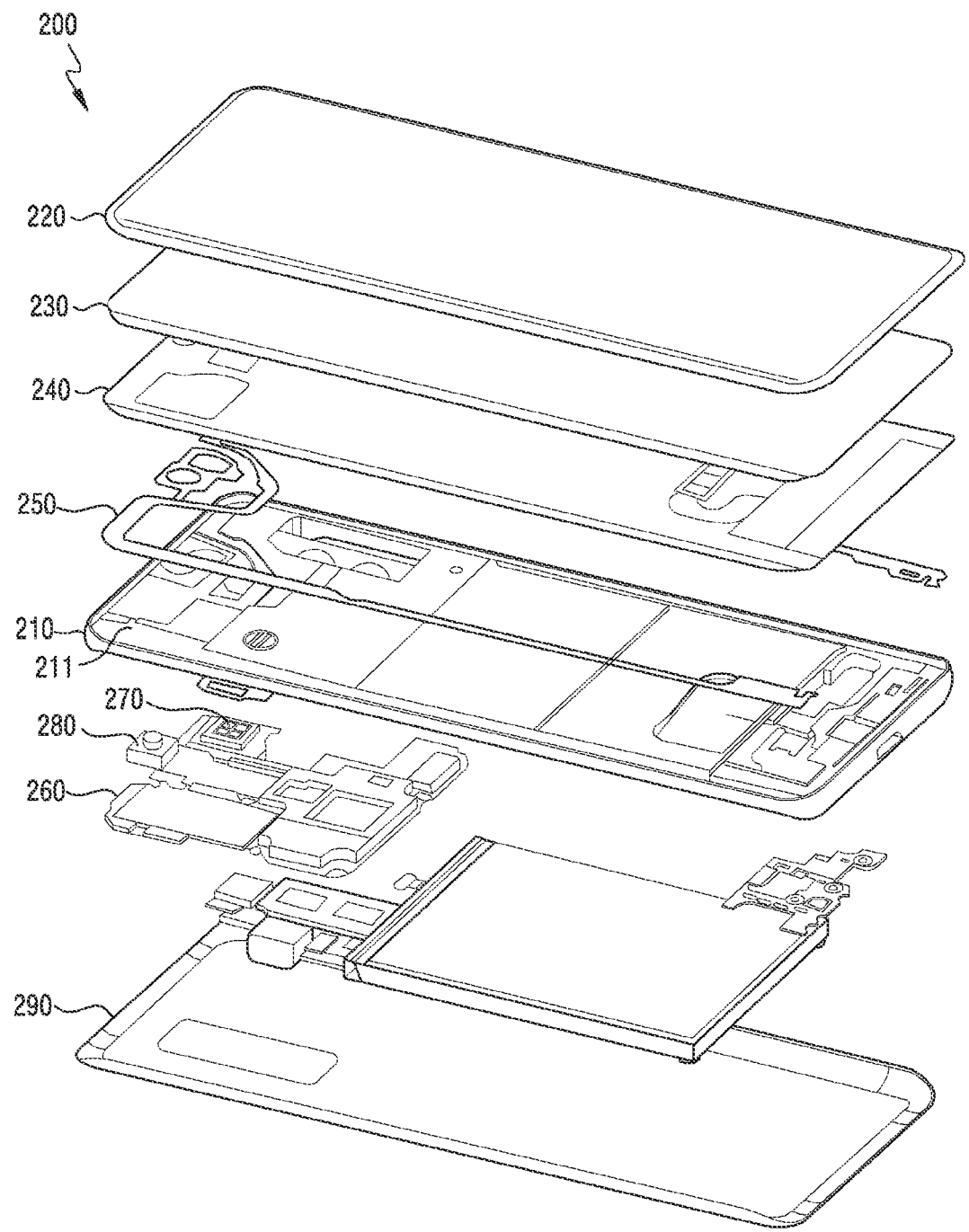
FIG. 3 is an exploded perspective view of an electronic device according to an embodiment of the disclosure.

FIG. 3 is an exploded perspective view of an electronic device according to an embodiment of the disclosure.

Referring to FIG. 3, an electronic device 200 may include a side surface bezel structure 210, a mid-plate 211 (for example, a bracket), a front surface plate 220, a display 230, a printed circuit board 260, a speaker 270, at least one sensor 280, and a rear surface plate 290. In a certain embodiment, the electronic device 200 may omit at least one of the components or may additionally include other components. At least one of the components of the electronic device 200 may be the same as or similar to at least one of the components of the electronic device 100 of FIG. 1 or 2, and a redundant explanation will be omitted.

In an embodiment, the mid-plate 211 may be disposed within the electronic device 200 to be connected with the side surface bezel structure 210, or may be integrally formed with the side surface bezel structure 210. The mid-plate 211 may be formed with, for example, a metallic material and/or a nonmetallic material (for example, a polymer). The display 230 may be coupled to one surface of the mid-plate 211, and the printed circuit board 260 may be coupled to the other surface of the mid-plate 211.

In an embodiment, the electronic device 200 may include the front surface plate 220 attached to the display 230. In an embodiment, the front surface plate 220 and the display 230 may be one component (for example, a display module).

In an embodiment, the electronic device 200 may include a protection layer 240 attached to a back surface of the display 230. In an embodiment, the protection layer 240 may include components for protecting the display 230 or guaranteeing heat emission performance of the display 230. For convenience of explanation, the display 230 of the disclosure may be understood as a concept including the protection layer 240. For example, the display 230, the front surface plate 220, and the protection layer 240 may be one component (for example, a display module).

In an embodiment, an adhesive member 250 may be attached between the display 230 and the mid-plate 211. In an embodiment, a portion of the adhesive member 250 may be attached between the front surface plate 220 and the mid-plate 211. For example, a portion of the adhesive member 250 may be attached between the display 230 and the mid-plate 211, and the other portion may be attached between the front surface plate 220 and the mid-plate 211. In an embodiment, the adhesive member 250 may be attached between the mid-plate 211 and the display 230 (or the front surface plate 220) along a boundary of the mid-plate 211. In an embodiment, a portion of the adhesive member 250 may be attached between the protection layer 240 attached to the back surface of the display 230 and the mid-plate 211.

In an embodiment, the adhesive member 250 may include a waterproof function. The adhesive member 250 may seal a gap between the mid-plate 211 and the display 230 (or the front surface plate 220, the protection layer 240) to prevent foreign substances from entering the electronic device 200 through the gap between the mid-plate 211 and the display 230 (or the front surface plate 220, the protection layer 240).

In an embodiment, the printed circuit board 260 may have a processor, a memory, and/or an interface mounted thereon. The processor may include, for example, one or more of a central processing device, an application processor, a graphic processing device, an image signal processor, a sensor hub processor, or a communication processor.

In an embodiment, the speaker 270 may be electrically connected with the processor to receive an acoustic signal from the processor. The speaker 270 may generate a sound by vibrating a driver according to the acoustic signal. The sound generated in the driver of the speaker 270 may be propagated to an acoustic output opening (for example, the receiver hole 114 of FIG. 1) through an acoustic output path (or a duct, a channel).

In an embodiment, the speaker may be disposed on the mid-plate 211. For example, the speaker may be assembled with (or mounted on) the printed circuit board 260, or may be connected with the printed circuit board 260 through a flexible connector. When the printed circuit board 260 is assembled on the mid-plate 211, the speaker may be positioned on the mid-plate 211.

In an embodiment, the electronic device 200 may include at least one sensor 280 positioned on the mid-plate 211. For example, the at least one sensor 280 may be assembled with (or mounted on) the printed circuit board 260, or may be connected with the printed circuit board 260 through a flexible connector. When the printed circuit board 260 is assembled on the mid-plate 211, the at least one sensor 280 may be positioned on the mid-plate 211. The at least one sensor 280 may include, for example, a camera sensor, an illuminance sensor, or a proximity sensor. In an embodiment, the at least one sensor 280 may be disposed on the back surface of the display 230. For example, an image sensor for a front-facing camera may be positioned on the back surface of the display 230. In this case, the display 230 may include an opening (for example, an opening aligned with the camera module 105 of FIG. 1) corresponding to an angle of view of the front-facing camera.

Figure 4:
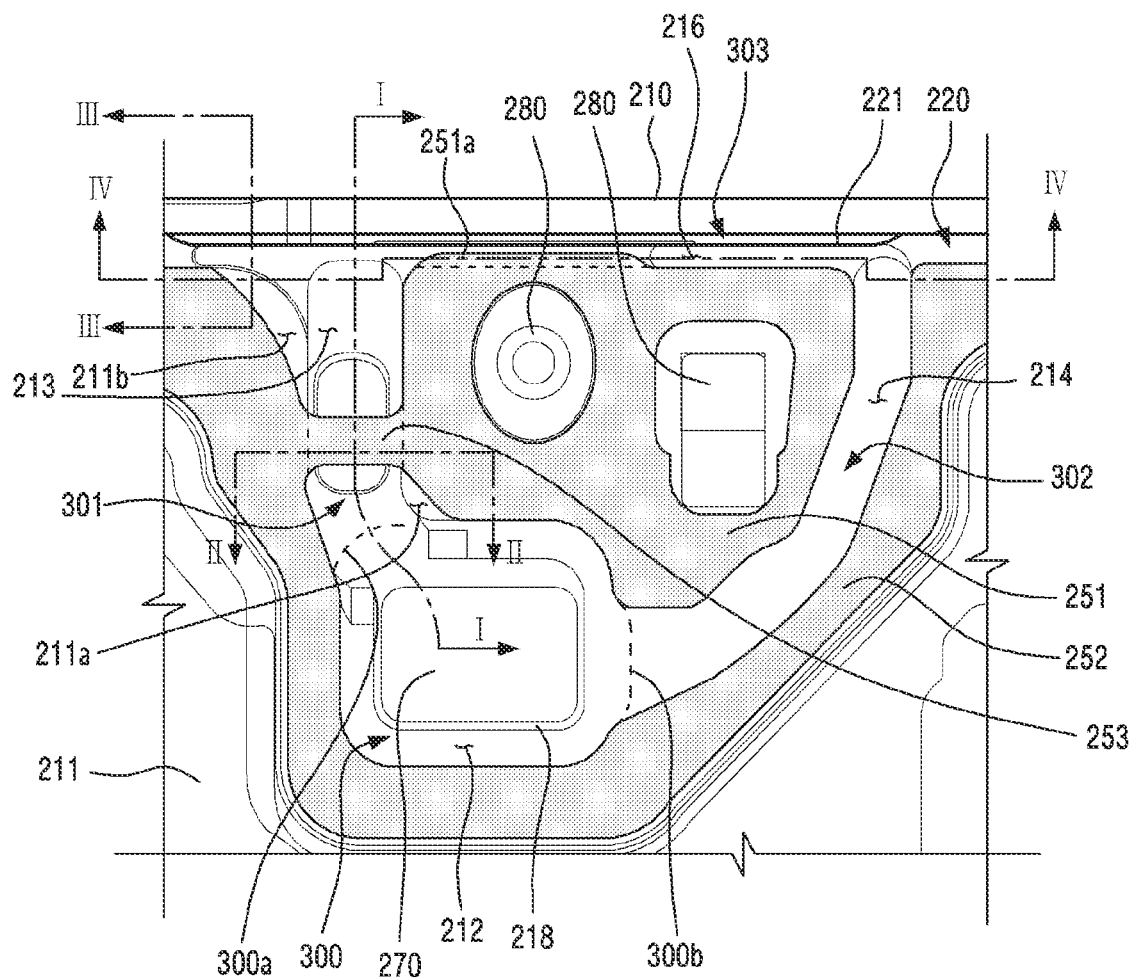
FIG. 4 is a view illustrating an acoustic output path for guiding a sound generated in a speaker of an electronic device to an acoustic output opening according to an embodiment of the disclosure.

FIG. 4 illustrates an acoustic output path (or a duct, a channel) for guiding a sound generated in a speaker of an electronic device to an acoustic output opening according to an embodiment of the disclosure.

Referring to FIG. 4, the mid-plate 211 may include an acoustic output path, and the adhesive member 250 may be positioned on the mid-plate 211. In the illustrated embodiment, the front surface plate 220 is displayed transparently, and the display 230 and the protection layer 240 are omitted.

In an embodiment, an acoustic output opening 303 may be positioned on a boundary of the front surface plate 220. In an embodiment, the acoustic output opening 303 may be formed lengthways in a horizontal direction along a portion of the boundary of the front surface plate 220.

In an embodiment, the front surface plate 220 may include a cutout portion (or a recess) 221 formed on a boundary thereof. A gap may be formed between the front surface plate 220 and the side surface bezel structure 210 due to the cutout portion 221 of the front surface plate 220. The acoustic output opening 303 may include a gap formed by the cutout portion 221 of the front surface plate 220.

In an embodiment, the electronic device 200 may include an acoustic chamber 300 positioned on an acoustic source (for example, the driver of the speaker 270). The acoustic chamber 300 may be implemented by a space between the display 230 and the mid-plate 211. In an embodiment, the mid-plate 211 may include a depressed portion 212 (for example, a recess) formed on a surface thereof facing the display 230, and a space surrounded by the depressed portion 212 may function as the acoustic chamber 300. For example, the mid-plate 211 may include the depressed portion 212 including a bottom surface formed one surface thereof to have a height lower than the periphery, and a sidewall extended from the bottom surface toward the display 230. The space surrounded by the depressed portion 212 may refer to a space that is surrounded by the bottom surface and the sidewall of the depressed portion 212.

Figure 5:
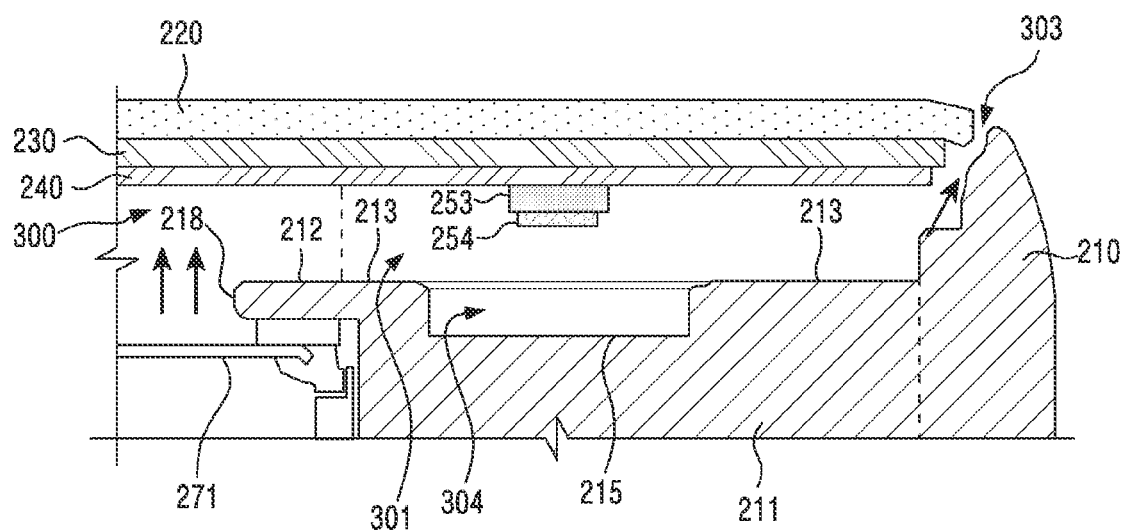
FIG. 5 is a cross-sectional view taken on line I-I of FIG. 4 according to an embodiment of the disclosure.

In an embodiment, the mid-plate 211 may be positioned between the driver 271 of the speaker 270 and the display 230. Referring to FIG. 5, the driver 271 of the speaker 270 may be installed under the mid-plate 211. In this case, the driver 271 of the speaker 270 may be connected with the acoustic chamber 300 formed between the mid-plate 211 and the display 230 through an opening 218 penetrating through the mid-plate 211.

In an embodiment, the acoustic chamber 300 may be connected with the acoustic output opening 303 through acoustic output paths 301 and 302. In an embodiment, the electronic device 200 may include the acoustic output paths 301 and 302 to guide a sound generated in the driver 271 of the speaker 270 to the acoustic output opening 303.

In an embodiment, the electronic device 200 may include a plurality of acoustic output paths 301 and 302. For example, the electronic device 200 may include a first acoustic output path 301, a second acoustic output path 302. In an embodiment, the acoustic chamber 300 may be connected with the plurality of acoustic output paths 301 and 302. For example, the acoustic chamber 300 may include a plurality of emission exits 300a and 300b, and the plurality of emission exits 300a and 300b may propagate the sound to the plurality of acoustic output paths 301 and 302, respectively. According to the illustrated embodiment, the acoustic chamber 300 may include a first emission exit 300a and a second emission exit 300b. The first emission exit 300a and the second emission exit 300b may be connected with the first acoustic output path 301 and the second acoustic output path 302, respectively. A portion of the sound generated in the driver 271 of the speaker 270 that exits from the first emission exit 300a/second emission exit 300b of the acoustic chamber 300 may be propagated to the acoustic output opening 303 through the first/second acoustic output paths 301/302.

The electronic device 200 may include three or more acoustic output paths although they are not illustrated in FIG. 4. For example, the three or more acoustic output paths may be configured to be extended from the acoustic chamber 300 toward the acoustic output opening 303.

In an embodiment, the first acoustic output path 301 and the second acoustic output path 302 may not overlap each other. For example, a first sound propagated to the first acoustic output path 301 and a second sound propagated to the second acoustic output path 302 may not be mixed with each other until they arrive at the acoustic output opening 303.

In an embodiment, the plurality of acoustic output paths 301 and 302 may guide the sound of the speaker 270 to various portion of the acoustic output opening 303. For example, when the acoustic output opening 303 is extended from a first portion toward a second portion, the first acoustic output path 301 may guide the sound of the speaker 270 to the first portion of the acoustic output opening 303, and the second acoustic output path 302 may guide the sound of the speaker 270 to the second portion of the acoustic output opening 303.

In an embodiment, the acoustic output paths 301 and 302 may be implemented by a space formed between the mid-plate 211 and the display. In an embodiment, the mid-plate 211 may include depressed portions 213 and 214 (for example, a recess, a groove), and the depressed portions 213, 214 may be extended from the driver 271 of the speaker 270 to the acoustic output opening 303. Referring to FIG. 5, the sound emitted from the driver 271 of the speaker 270 may be propagated to the acoustic output opening 303 through a space guaranteed by the depressed portion 213 of the mid-plate 211 in the acoustic chamber 300. For example, the mid-plate 211 may include the depressed portion 213 including a bottom surface lower than the periphery thereof, and a sidewall extended from the bottom surface toward the display 230. The sound emitted from the acoustic chamber 300 may be propagated to the acoustic output opening 303 through the medium of air existing in a space surrounded by the bottom surface and the sidewall of the depressed portion 213.

According to an embodiment, since the first acoustic output path 301 and the second acoustic output path 302 are separated from each other, the first acoustic output path 301 and the second acoustic output path 302 may be configured to output sounds of different registers, respectively. In this case, the speaker 270 may include two or more drivers to propagate sounds to the first acoustic output path 301 and the second acoustic output path 302, respectively. For example, a first driver responsible for a low register may be connected with the first acoustic output path 301, and a second diver responsible for a high register may be connected with the second acoustic output path 302. In this case, the first driver and the second driver may propagate sounds to the acoustic chamber 300 which is divided, respectively. For example, the acoustic chamber 300 may include a first acoustic chamber and a second acoustic chamber which are spatially divided by a partition, and drivers responsible for different registers may be acoustically connected to the respective acoustic chambers.

In an embodiment, the depressed portions 213 and 214 providing the acoustic output paths 301 and 302 may be designed in shapes appropriate to characteristics of sounds emitted through corresponding acoustic output paths 301 and 302. For example, the first depressed portion 213 may have a structure (for example, a width, a depth, a length of a path, etc.) appropriate for emitting a sound of a low register, and the second depressed portion 214 may have a structure appropriate for emitting a sound of a high register. If registers dealt with by the plurality of acoustic output paths 301 and 302 are different, a resolution of a sound finally outputted from the acoustic output opening 303 may increase.

In an embodiment, the mid-plate 211 may include the first depressed portion 213 and the second depressed portion 214 which are extended from the acoustic chamber 300. In this case, the first acoustic output path 301 may include a space surrounded by the first depressed portion 213, and the second acoustic output path 302 may include a space surrounded by the second depressed portion 214.

In an embodiment, the electronic device 200 may include at least one sensor 280 positioned under the display 230. For example, an electronic component for receiving external light of the electronic device 200, such as a camera module, an image sensor, an illuminance sensor, a proximity sensor, etc., may be positioned under the display 230.

In an embodiment, the at least one sensor 280 may be positioned between the acoustic output opening 303 and the acoustic chamber 300. In an embodiment, at least a portion of the at least one sensor 280 may be positioned on the same plane or substantially the same plane as the acoustic output paths 301 and 302. Accordingly, the depressed portions 213 and 214 providing the acoustic output paths 301 and 302 may be formed to detour around an area where the at least one sensor 280 is positioned.

In an embodiment, the mid-plate 211 may include a first surface 211a on which the sensor is positioned, and a second surface 211b which is separated from the first surface 211a by the depressed portion (that is, the acoustic output paths 301 and 302 and the acoustic chamber 300). In an embodiment, the first surface 211a and the second surface 211b may be formed higher than the bottom surface of the depressed portion (i.e., the acoustic output paths 301 and 302 and the acoustic chamber 300).

In an embodiment, the acoustic output paths 301 and 302 may surround a portion of a boundary of the first surface 211a of the mid-plate 211 on which the at least one sensor 280 is disposed. For example, the acoustic chamber 300, the first acoustic output path 301, and the second acoustic output path 302 may surround a portion of the boundary of the first surface 211a. According to the embodiment illustrated in FIG. 4, the at least one sensor 280 may be positioned within a closed curve line passing through the first acoustic output path 301, the second acoustic output path 302, the acoustic chamber 300, and the acoustic output opening 303.

In an embodiment, the first surface 211a and the second surface 211b of the mid-plate 211 may be attached to the protection layer 240 through the adhesive member 250. In an embodiment, the adhesive member 250 may be attached to a portion adjacent to the boundary of the first surface 211a, and a portion adjacent to the boundary of the second surface 211b. In an embodiment, the adhesive member 250 may include a waterproof function. In this case, the adhesive member 250 may have a width enough to ensure waterproof performance. The adhesive member 250 may be positioned between the mid-plate 211 and the protection layer 240 to seal a gap between the mid-plate 211 and the protection layer 240. The adhesive member 250 can prevent foreign substances entering between the protection layer 240 and the side surface bezel structure 210 from permeating into the sensor.

In an embodiment, the adhesive member 250 may include a sensor part 251 attached between the mid-plate 211 and the protection layer 240 along the boundary of the first surface 211a, and a main part 252 attached between the mid-plate 211 and the protection layer 240 along the boundary of the second surface 211b.

Since the first surface 211a and the second surface 211b of the mid-plate 211 are separated from each other by the depressed portion (for example, the first acoustic output path 301, the second acoustic output path 302, and the acoustic chamber 300), the sensor part 251 and the main part 252 of the adhesive member 250 may be attached to the first surface 211a and the second surface 211b, respectively, while being separated from each other. However, if the sensor part 251 is attached separately from the main part 252, a problem may arise. For example, if the sensor part 251 has a relatively smaller size than the main part 252, the sensor part 251 may be lost in a manufacturing process of attaching the adhesive member to the mid-plate 211, the display 230, or the front surface plate 220. In another example, if the sensor part has a small size, a product durability (reliability) problem may arise due to an external environment condition (falling or a temperature condition such as a thermal shock). If adhesion is low due to narrow width of a tape, shoving may occur in an external temperature condition or a condition like falling and thus the waterproof function may be degraded. Accordingly, the sensor part 251 attached to the first surface 211a of the mid-plate 211 and the main part 252 attached to the second surface 211b of the mid-plate 211 may need to be integrally formed with each other.

Referring to FIG. 4, the adhesive member 250 may include a bridge part 253 to connect the main part 252 and the sensor part 251. In an embodiment, the bridge part 253 may be extended from the main part 252 and may be connected to the sensor part 251 across the acoustic output paths 301 and 302. For example, one end of the bridge part 253 may be connected with a boundary of the main part 252 and the other end may be connected with a boundary of the sensor part 251. In an embodiment, one surface of the bridge part 253 may be attached to the protection layer 240, and the other surface may face the first acoustic output path 301. The bridge part 253 may have a width enough to prevent the sensor part 251 and the main part 252 from being separated from each other in a manufacturing process.

In the illustrated embodiment, the bridge part 253 may be positioned over the first acoustic output path 301. However, embodiments of the disclosure are not limited thereto. For example, the bridge part 253 may be positioned over the second acoustic output path 302. In another example, at least one bridge part may be positioned over the acoustic chamber 300, the first acoustic output path 301, and/or the second acoustic output path 302.

FIG. 5 is a cross-sectional view taken on line I-I of FIG. 4 according to an embodiment of the disclosure.

Figure 6:
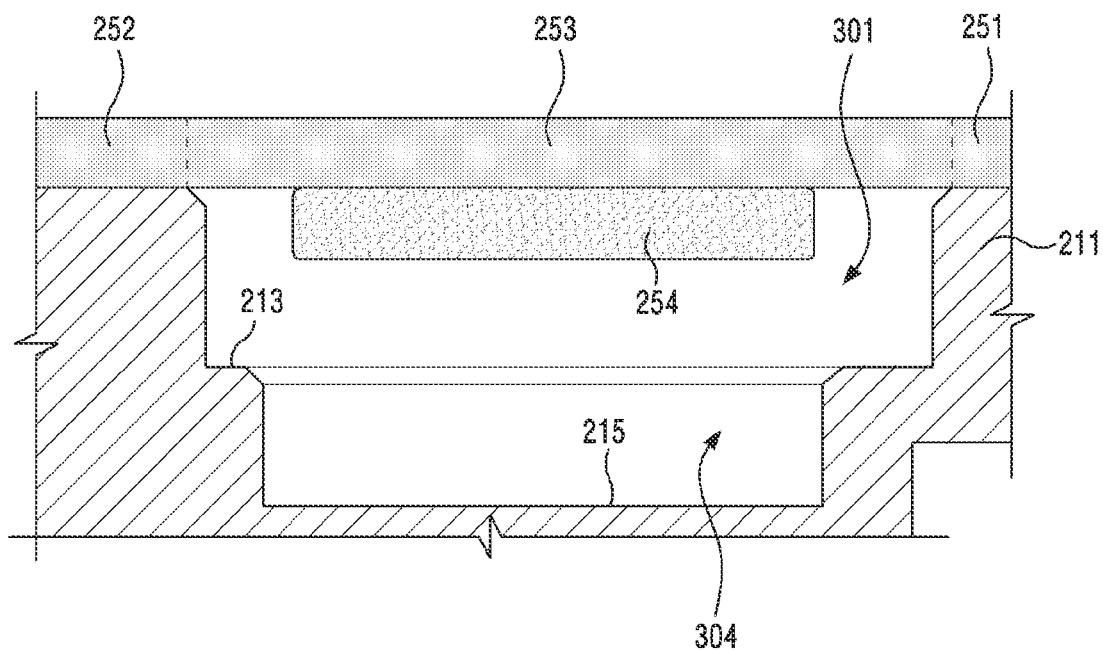
FIG. 6 is a cross-sectional view taken on line II-II of FIG. 4 according to an embodiment of the disclosure.

FIG. 6 is a cross sectional view take on line II-II of FIG. 4 according to an embodiment of the disclosure.

The cross section taken on line II indicates the acoustic output paths 301, 302 from the driver 271 of the speaker 270 to the acoustic output opening 303, and the cross section taken on line II-II indicates a cross section perpendicular to an acoustic propagation direction.

Referring to FIG. 5, a sound of the speaker 270 may be propagated to the acoustic output opening 303 through a space between the mid-plate 211 and the protection layer 240. Vibrations of air caused by the driver 271 of the speaker 270 may be propagated to the acoustic output opening 303 through the air existing in the space (that is, the first acoustic output path 301) between the mid-plate 211 and the protection layer 240.

In the illustrated embodiment, the bridge part 253 may be positioned over the first acoustic output path 301. Since the adhesive member 250 generally includes an adhesive ingredient on a surface thereof, external foreign substances may be attached to a surface of the bridge part 253. If foreign substances are attached to the bridge part 253, an area allowing a sound to pass therethrough may be reduced, and acoustic quality of the speaker 270 may be degraded.

Accordingly, in an embodiment, the electronic device 200 may include a masking tape 254 attached under the bridge part 253.

In an embodiment, the masking tape 254 may include a surface that has no adhesive ingredient. When the masking tape 254 is attached to the bridge part 253, the surface of the masking tape 254 that has no adhesive ingredient may face the first acoustic output path 301. Since a surface of the bridge part 253 that includes an adhesive ingredient is not exposed to the first acoustic output path 301, foreign substance can be prevented from being attached to the adhesive member 250, and accordingly, acoustic quality of the speaker 270 can be enhanced.

Referring to FIG. 6, the bridge part 253 and the masking tape 254 may occupy some area of the first acoustic output path 301. When a sound propagated through the first acoustic output path 301 passes through a portion where the bridge part 253 exists, an area allowing the sound to pass therethrough may be reduced as much as cross sections of the bridge part 253 and the masking tape 254. In an embodiment, the electronic device 200 may further include an additional depressed portion 215 formed on a portion of the first acoustic output path 301 that corresponds to the bridge part 253. The depressed portion 215 provides an additional space 304 to the first acoustic output path 301, so that the electronic device 200 can compensate for the emission space of the sound reduced by the bridge part 253 and the masking tape 254.

For example, the first acoustic output path 301 may include the first depressed portion 213 (or a groove) extended from the acoustic chamber 300 to the acoustic output opening 303, and may include the third depressed portion 215 (or a recess) formed on a bottom of a portion of the groove that corresponds to the bridge part 253. In an embodiment, the third depressed portion 215 may have a depth corresponding to thicknesses of the bridge part 253 and the masking tape 254. In an embodiment, a length of the third depressed portion 215 may be longer than a width of the bridge part 253. In an embodiment, a width of the third depressed portion 215 may be equal to or smaller than a width of the first depressed portion 213. An area (or space) allowing a sound to pass therethrough can be guaranteed by the third depressed portion 215 formed on the bottom surface of the first depressed portion 213.

In the embodiment illustrated in FIGS. 5 and 6, the masking tape 254 may be attached to one surface of the bridge part 253, but embodiments of the disclosure are not limited thereto. If the adhesive ingredient included in the surface of the bridge part 253 is removed, the masking tape 254 does not need to be attached to one surface of the bridge part 253. In this case, the third depressed portion 215 may have a depth corresponding to the thickness of the bridge part 253.

The acoustic output opening 303 may have a shape extended widthways. Since a vertical length of the acoustic output opening 303 is narrow, a space enough to allow a sound to exit therefrom should be guaranteed. A structure providing an additional space 305 to the acoustic output paths 301 and 302 will be described in FIGS. 7 and 8.

Figure 7:
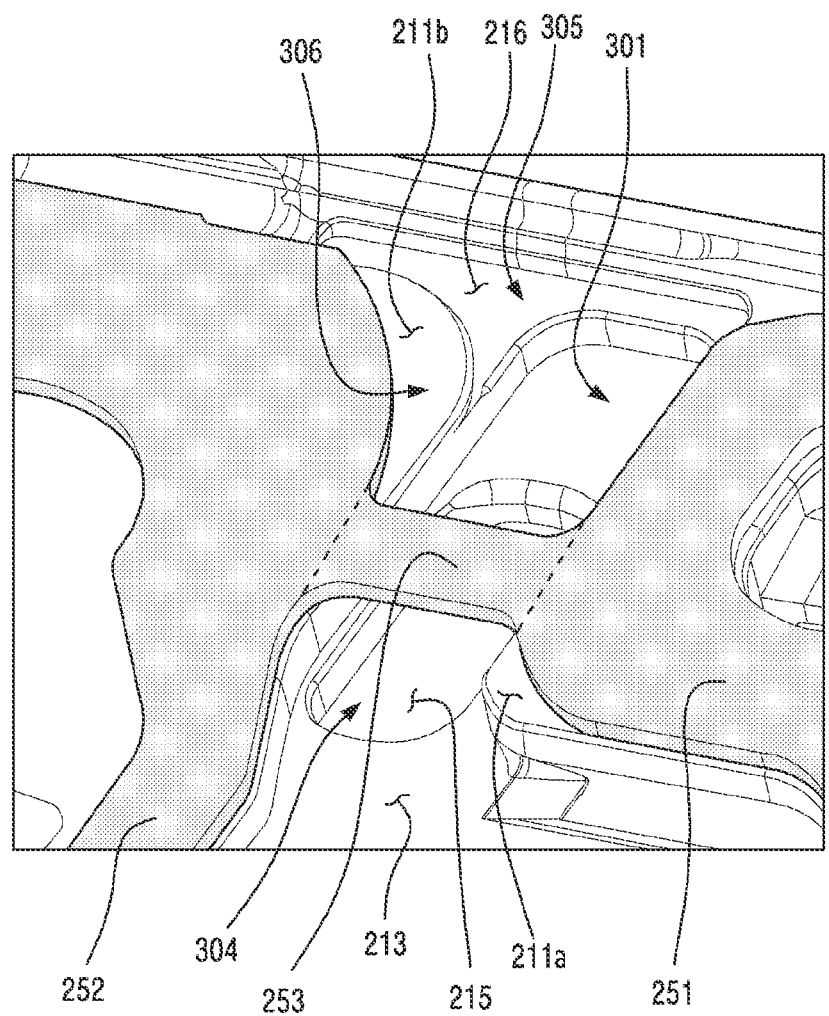
FIG. 7 is a view illustrating a depressed portion formed according to a shape of an acoustic output opening according to an embodiment of the disclosure.

FIG. 7 illustrates a depressed portion formed according to a shape of an acoustic output opening according to an embodiment of the disclosure.

Figure 8:
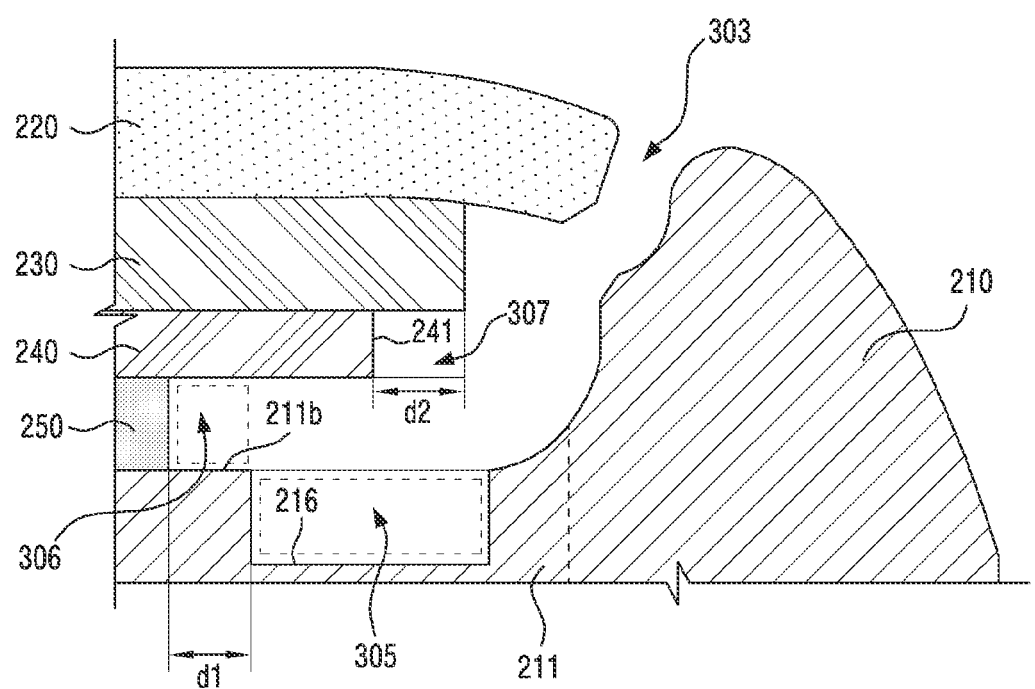
FIG. 8 is a cross-sectional view taken on line III-III of FIG. 4 according to an embodiment of the disclosure.

FIG. 8 is a cross-sectional view taken on line III-III of FIG. 4 according to an embodiment of the disclosure.

Referring to FIG. 7, the first acoustic output path 301 of the electronic device 200 may include a space 305 that is guaranteed by the depressed portion 216 (for example, a recess, a groove) positioned on a portion adjacent to the acoustic output opening 303 of the mid-plate 211. The space 305 guaranteed by the depressed portion 216 may form an end of the first acoustic output path 301.

In an embodiment, the depressed portion 216 may be configured to correspond to the shape of the acoustic output opening 303. In an embodiment, the depressed portion 216 may be extended along the acoustic output opening 303. For example, the depressed portion 216 may have a length corresponding to a portion of the acoustic output opening 303. In an embodiment, the depressed portion 216 may have a depth shallower than the other depressed portions (for example, the first depressed portion 213, the second depressed portion 214, the third depressed portion 215) forming the acoustic output paths 301 and 302. For example, the fourth depressed portion 216 which is extended from an end of the first depressed portion 213/the second depressed portion 214 and has a shape corresponding to the acoustic output opening 303 may include a bottom surface higher than the first depressed portion 213. A sound emitted from the driver 271 of the speaker 270 and passing through the first depressed portion 213/the second depressed portion 214 may be propagated to the space 305 formed by the fourth depressed portion 216. Since the fourth depressed portion 216 has a shape corresponding to the acoustic output opening 303, the sound of the driver 271 of the speaker 270 may smoothly exit to the acoustic output opening 303.

In the same way as described in FIG. 4, the adhesive member 250 may be attached between the mid-plate 211 and the display along an area (hereinafter, a boundary area) adjacent to the boundary of the second surface 211b of the mid-plate 211. In an embodiment, the adhesive member 250 may not be attached to a portion of the boundary area of the second surface 211b.

Referring to FIG. 8, a portion of the main part 252 of the adhesive member 250 may be spaced apart from the fourth depressed portion 216 by a predetermined distance d1. Accordingly, a space 306 corresponding to a thickness of the adhesive member 250 may be formed between the protection layer 240 and the mid-plate 211. Referring to FIG. 8 along with FIG. 7, in an embodiment, the adhesive member 250 disposed between the mid-plate 211 and the protection layer 240 may be spaced apart from the boundary of the second surface 211b or the fourth depressed portion 216. Accordingly, there may exist a portion without the adhesive member 250 between the boundary area of the second surface 211b of the mid-plate 211, and the protection layer 240. Accordingly, the electronic device 200 may include the space 306 between the second surface 211b of the mid-plate 211 and the protection layer 240 as a portion of the first acoustic output path 301.

Referring to FIG. 8, a portion of a boundary of the protection layer 240 in an embodiment may be spaced apart from a boundary of the display 230 by a predetermined distance d2. In an embodiment, the protection layer 240 may include a cutout portion 241 on the boundary thereof. In an embodiment, the protection layer 240 may include the cutout portion 241 formed on a portion of the boundary of the protection layer 240 that corresponds to the acoustic output opening 303. In an embodiment, the cutout portion 241 of the protection layer 240 may provide an additional space 307 to allow a sound to propagate therethrough. The first acoustic output path 301 may include the space 307 guaranteed by the cutout portion 241 of the protection layer 240. In the illustrated embodiment, a portion of the boundary area of the display 230 may be exposed to the first acoustic output path 301 through the cutout portion 241 of the protection layer 240.

Referring to FIG. 8, the electronic device 200 may include an empty space between boundary portions (that is, portions adjacent to the acoustic output opening 303) of the front surface plate 220 and the display 230, and the mid-plate 211, as the acoustic output paths 301, 302. Accordingly, a portion of the boundary portions of the front surface plate 220 and the display 230 may not be supported by the mid-plate 211. When an external force is applied to the portion that is not supported by the mid-plate 211, the front surface plate 220 or the display 230 may be damaged.

Figure 9:
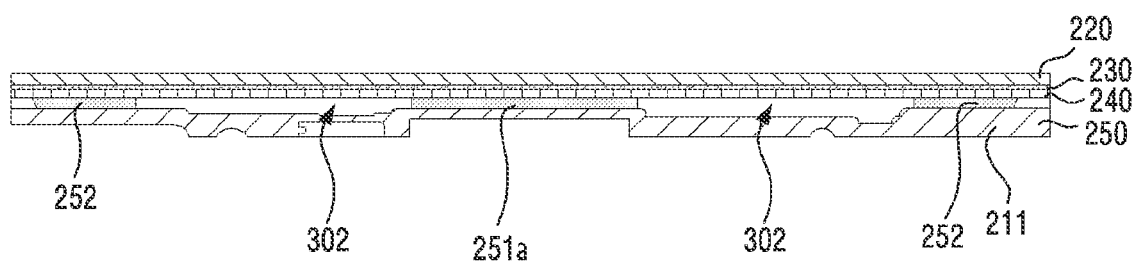
FIG. 9 is a cross-sectional view taken on line IV-IV of FIG. 4 according to an embodiment of the disclosure.

FIG. 9 is a cross-sectional view taken on line IV-IV of FIG. 4, and illustrates a structure supporting the boundary portions of a front surface plate and a display according to an embodiment of the disclosure.

Referring to FIG. 9, in an embodiment, the first surface 211a of the mid-plate 211 may be attached to the protection layer 240 through the sensor part 251 of the adhesive member 250. Referring to FIG. 9 along with FIG. 4, the sensor part 251 of the adhesive member 250 in an embodiment may include a portion 251 extended toward the acoustic output opening 303. The extended portion 251a of the sensor part 251 may fill a space between the first surface 211a of the mid-plate 211 and the protection layer 240.

In an embodiment, the main part 252 of the adhesive member 250 may support portions of the display 230 adjacent to the acoustic output opening 303 on both sides. In an embodiment, the extended portion 251a of the sensor part 251 may support a center portion of the display 230. Since portions of the display 230 adjacent to the acoustic output opening 303 may be supported not only by the main part 252 but also by the sensor part 251, sagging of the front surface plate 220 and/or the display 230 can be reduced.

In various embodiments described above, an electronic device (for example, the electronic device 200 of FIG. 3) may include: a housing including a first surface facing in a first direction, a second surface facing in a second direction opposite to the first direction, and a side surface member (for example, the side surface bezel structure 210 of FIG. 3) enclosing the first surface and the second surface; a display (for example, the display 230 of FIG. 3) visible through at least a portion of the first surface; an opening (for example, the acoustic output opening 303 of FIG. 4) formed on a portion of the first surface; a speaker (for example, the speaker 270 of FIG. 3) positioned within the housing; a sensor (for example, the at least one sensor 280 of FIG. 3) positioned within the housing; and a first path (for example, the first acoustic output path 301 of FIG. 4) configured to guide a sound of the speaker to the opening, and a second path (for example, the second acoustic output path 302 of FIG. 4) configured to guide the sound of the speaker to the opening and to avoid overlapping the first path, and at least a portion of the sensor may be positioned between the first path and the second path.

In an embodiment, at least a portion of the sensor may be positioned between the opening and the speaker.

In an embodiment, the electronic device may further include a mid-plate (for example, the mid-plate 211 of FIG. 3) positioned on a back surface of the display, and the mid-plate may include a first depressed portion (for example, the first depressed portion 213 of FIG. 4) and a second depressed portion (for example, the second depressed portion 214 of FIG. 4) which are extended from the speaker toward the opening on a surface thereof facing the display, and the first path may include a space surrounded by the first depressed portion, and the second path may include a space surrounded by the second depressed portion.

In an embodiment, the electronic device may further include an adhesive member (for example, the adhesive member 250 of FIG. 4) attached between the mid-plate and the display, and the mid-plate may include a first surface (for example, the first surface 211a of FIG. 4) on which the sensor is positioned, and a second surface (for example, the second surface 211b) which is separated from the first surface by the first path and the second path, and the adhesive member may include a first part (for example, the sensor part 251 of FIG. 4) which is attached between the mid-plate and the display along a boundary of the first surface, a second part (for example, the main part 252 of FIG. 4) which is attached between the mid-plate and the display along a boundary of the second surface, and a third part (for example, the bridge part 253 of FIG. 4) which is extended from a portion of the first part to a portion of the second part, and the third part may be positioned over the first path or the second path.

In an embodiment, one surface of the third part may face the display, and the other surface may face the first path or the second path, and the other surface of the third part may be devoid of an adhesive ingredient or may be attached to a masking tape (for example, the masking tape 254 of FIG. 5).

In an embodiment, the mid-plate may include a third depressed portion (for example, the third depressed portion 215 of FIG. 4) formed on a bottom surface of a position of the first path or the second path that corresponds to the third part.

In an embodiment, a portion of the second part may be spaced apart from a boundary of the second surface, and the first path or the second path may include a space that is guaranteed between the second surface and the display as the second part is spaced apart from a boundary of the second surface.

In an embodiment, the first part may further include a portion (for example, the extended portion 251a of FIG. 4) that is extended from a boundary thereof toward the opening.

In an embodiment, the mid-plate may include a fourth depressed portion (for example, the fourth depressed portion 216 of FIG. 7) formed on a portion thereof adjacent to the opening, and the first path and/or the second path may include a space (for example, the space 305 of FIG. 7) surrounded by the fourth depressed portion.

In an embodiment, the fourth depressed portion may have a depth shallower than the first depressed portion or the second depressed portion.

In an embodiment, the mid-plate and the side surface member may be integrally formed with each other.

In an embodiment, a driver of the speaker may be positioned on a surface of the mid-plate that faces opposite to the display, and the driver of the speaker may be configured to propagate a sound to the first path and the second path through an opening (for example, the opening 218 of FIG. 4) of the mid-plate.

In an embodiment, the electronic device may further include a front surface plate (for example, the front surface plate 220 of FIG. 3) attached onto the display to form a portion of the first surface, a portion of a boundary of the front surface plate may be spaced apart from the side surface member to form a gap between the front surface plate and the side surface member, and the opening may include the gap between the front surface plate and the side surface member.

In an embodiment, the front surface plate may include a cutout portion (for example, the cutout portion 221 of FIG. 4) formed on a boundary thereof, and the gap between the front surface plate and the side surface member may correspond to the cutout portion.

In an embodiment, the electronic device may further include an acoustic chamber (for example, the acoustic chamber 300 of FIG. 4) corresponding to the speaker within the housing, the first path may be extended from a first exit (for example, the first emission exit 300a of FIG. 4) of the acoustic chamber, and the second path may be extended from a second exit (for example, the second emission exit 300b of FIG. 4) of the acoustic chamber.

In an embodiment, the opening may be extended from a first portion to a second portion, and the first path may guide a sound of the speaker to the first portion of the opening, and the second path may guide the sound of the speaker to the second portion of the opening.

In an embodiment, the sensor may be positioned within a closed curve line passing through the first path, the second path, and the opening.

In an embodiment, the electronic device may further include a protection layer (for example, the protection layer 240 of FIG. 3) attached to a back surface of the display, the protection layer may include a cutout portion (for example, the cutout portion 241 of FIG. 7) formed a portion of a boundary thereof, and the first path or the second path may include a space (for example, the space 307 of FIG. 7) that is guaranteed by the cutout portion.

In an embodiment, the sensor may include at least one of an image sensor, a proximity sensor, or an illuminance sensor.

In an embodiment, the sensor may be an image sensor of a camera positioned within the housing, and the display may include an opening corresponding an angle of view of the camera.

The electronic device 200 according to various embodiments disclosed in the disclosure may be various types of electronic devices. The electronic device 200 may include, for example, a portable communication device (for example, a smartphone), a computer device, a portable multimedia device, a portable medical device, a camera, a wearable device, or a home appliance. The electronic device 200 according to an embodiment of the disclosure is not limited to the above-mentioned devices.

The electronic device according to various embodiments of the disclosure can smoothly output a sound of the speaker embedded therein to the acoustic output opening. As a space allowing the sound of the speaker to propagate therethrough is guaranteed, a user can enjoy a clear and rich sound by using the portable device.

The effect achieved by the disclosure is not limited to that mentioned above, and other effects that are not mentioned above may be clearly understood to those skilled in the art based on the description provided above.

It should be appreciated that various embodiments of the disclosure and terms used therein are not intended to limit the technological features set forth herein to particular embodiments, and include various modifications, equivalents, or alternatives of embodiments of the disclosure. With regard to the description of the drawings, similar reference numerals may be used to refer to similar elements. A singular form of a noun corresponding to an item may include one item or a plurality of items unless otherwise specified. In the disclosure, the expressions "A or B," "at least one of A and B," "at least one of A or B," "A, B, or C," "at least one of A, B, and C," and "at least one of A, B, or C" may include any one or all possible combinations of the items enumerated together. As used herein, such terms as "1st" and "2nd," or "first" and "second" may be used to simply distinguish a corresponding component from another, and does not limit the components in other aspect (e.g., importance and/or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:
   a housing including a side surface structure, a front plate, and a rear plate;
   a mid-plate disposed with the side surface structure, the side surface structure and the front plate disposed such that an acoustic output opening is formed therebetween, and the mid-plate including a first acoustic output path and a second acoustic output path formed thereon;
   a display module disposed over the mid-plate such that an edge of the display module is adjacent to the acoustic output opening;
   a sensor disposed on the mid-plate such that the sensor is disposed at least partially between the first acoustic output path and the second acoustic output path;
   a speaker disposed on the mid-plate such that an output portion of the speaker is at least partially arranged to communicate with the first acoustic output path and the second acoustic output path; and
   an adhesive member disposed between the display module and the mid-plate, the adhesive member including a first adhesive portion at least partly surrounded by the first acoustic output path and the second acoustic output path, and a second adhesive portion at least partly surrounding the first acoustic output path and the second acoustic output path, the first adhesive portion, the second adhesive portion, the display module, and the mid-plate together forming a sound path extended from a second opening and to the acoustic output opening such that a sound generated by the speaker is to be outputted out of the portable communication device through the second opening, the sound path and the acoustic output opening.

2. The portable communication device of claim 1, wherein the sound path includes a first sound path portion configured to guide the sound along a first side of the first adhesive portion, and a second sound path portion configured to guide the sound along a second side of the first adhesive portion different than the first side.

3. The portable communication device of claim 2, wherein the first sound path portion and the second sound path portion are connected with each other via an air gap portion between the acoustic output opening and the first adhesive portion.

4. The portable communication device of claim 1, wherein the mid-plate includes a recessed portion formed on a surface corresponding to at least a part of the sound path.

5. The portable communication device of claim 4, wherein the adhesive member includes a third adhesive portion formed as crossing over the recessed portion.

6. The portable communication device of claim 5, wherein the third adhesive portion is extended from the first adhesive portion to the second adhesive portion.

7. The portable communication device of claim 1, wherein the acoustic output opening, the first acoustic output path and the second acoustic output path are formed in a same direction.

8. The portable communication device of claim 1, wherein the mid-plate includes a first surface on which the sensor is positioned, a recessed portion surrounding the first surface and second surface separated from the first surface by the recessed portion.

9. The portable communication device of claim 8, wherein a third adhesive portion extends from the second adhesive portion and is connected to the first adhesive portion across the first acoustic output path.

10. The portable communication device of claim 9, wherein the first adhesive portion, the second adhesive portion, and the third adhesive portion are formed integrally.

* * * * *